United States Patent
Pelletier

(10) Patent No.: US 8,488,583 B2
(45) Date of Patent: Jul. 16, 2013

(54) METHOD AND APPARATUS FOR RELOCATING A HEADER COMPRESSION CONTEXT IN A WIRELESS COMMUNICATION SYSTEM

(75) Inventor: Ghyslain Pelletier, Boden (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 816 days.

(21) Appl. No.: 12/531,409

(22) PCT Filed: Mar. 12, 2008

(86) PCT No.: PCT/SE2008/000195
§ 371 (c)(1),
(2), (4) Date: Sep. 15, 2009

(87) PCT Pub. No.: WO2008/115116
PCT Pub. Date: Sep. 25, 2008

(65) Prior Publication Data
US 2010/0027497 A1    Feb. 4, 2010

(30) Foreign Application Priority Data

Mar. 16, 2007  (SE) ........................ 0700670

(51) Int. Cl.
*H04J 3/24* (2006.01)
*H04J 1/10* (2006.01)
*H04J 3/16* (2006.01)
*H04L 12/28* (2006.01)
*H04W 40/00* (2009.01)
*G06F 15/16* (2006.01)

(52) U.S. Cl.
USPC ........... 370/349; 370/255; 370/315; 370/466; 455/446; 709/247

(58) Field of Classification Search
USPC ..... 370/466, 315, 912.255; 455/446; 709/247
See application file for complete search history.

(56) References Cited

U.S. PATENT DOCUMENTS

| | | | |
|---|---|---|---|
| 2002/0031149 A1* | 3/2002 | Hata et al. ...................... | 370/912 |
| 2002/0091860 A1* | 7/2002 | Kalliokulju et al. .......... | 709/247 |
| 2005/0195750 A1* | 9/2005 | Le et al. ........................ | 370/252 |
| 2006/0067361 A1* | 3/2006 | Lee et al. ...................... | 370/466 |
| 2007/0189196 A1* | 8/2007 | Miller et al. .................. | 370/315 |
| 2008/0045224 A1* | 2/2008 | Lu et al. ........................ | 455/446 |

FOREIGN PATENT DOCUMENTS

| | | |
|---|---|---|
| EP | 1337124 A2 | 8/2003 |
| EP | 1482700 A2 | 12/2004 |
| EP | 1356655 B1 | 9/2006 |
| WO | 02/11397 A1 | 2/2002 |

OTHER PUBLICATIONS

Qualcomm Europe, On UPE relocation, 3GPP TSG-RAN WG2 meeting #55, Oct. 9-13, 2006, R2-062957, Seoul, Korea.
Alcatel-Lucent, Discussion on PDCP context transfer, 3GPP TSG RAN WG2 #57, Feb. 12-16, 2007, S2-070617, Saint-Louis, USA.

* cited by examiner

Primary Examiner — Ian N Moore
Assistant Examiner — Kiet Tang
(74) Attorney, Agent, or Firm — Coats & Bennett, P.L.L.C.

(57) ABSTRACT

The present invention relates to a method and an apparatus for relocating a header compression text, wherein the context updating properties of each individual header during the relocation process is disabled.

24 Claims, 7 Drawing Sheets

METHOD AND APPARATUS FOR RELOCATING A HEADER COMPRESSION CONTEXT IN A WIRELESS COMMUNICATION SYSTEM

TECHNICAL FIELD

The present invention relates to a method and an apparatus in a wireless communication system and, particularly to an apparatus allowing for relocating a header compression text as well as a method for such relocation.

BACKGROUND

Due to the tremendous success of the Internet, it has become a challenging task to make use of the Internet Protocol (IP) over all kinds of links. However, because of the fact that the headers of the IP protocols are rather large, it is not always a simple task to make this come true for narrow band links, for example wireless cellular links. As an example, consider ordinary speech data transported by the protocols (IP, UDP, RTP) used for Voice-over-IP (VoIP), where the header may represent about 70% of the packet—resulting in a very inefficient usage of the link.

The term header compression (HC) (defined further below) comprises the art of minimizing the necessary bandwidth for information carried in headers on a per-hop basis over point-to-point links. The techniques in general have a more than ten-year-old history within the Internet community; several commonly used protocols exist such as Van Jacobson (VJ), IP Header Compression (IPHC) and compressed real-time transport protocol (CRTP). Header compression takes advantage of the fact that some fields in the headers are not changing within a flow, or change with small and/or predictable values. Header compression schemes make use of these characteristics and send static information only initially, while changing fields are sent with their absolute values or as differences from packet to packet. Completely random information has to be sent without any compression at all.

Header compression is thus an important component to make IP services over wireless, such as voice and video services, economically feasible. Header compression solutions have been developed by the Robust Header Compression (ROHC) Working Group of the IETF (Internet Engineering Task Force) to improve the efficiency of such services.

Other optimizations, such as other types of compression, may also be used to further increase the performance of bandwidth-limited systems. These include payload compression, signalling compression, header removal and regeneration, and header compression. Many of these compression schemes may be designed to make use of a compression and/or decompression context.

The evolution and design using new architectural models tend to move the optimization functions closer to the air interface. For example, in System Architecture Evolution/Long Term Evolution (SAE/LTE) systems the header compression function is located in the enhanced Node B (eNB). Other systems have header compression function in e.g. the Core Network (CN) or in the Radio Network Controller (RNC).

In most systems, a mobility event that changes the node that performs the function providing the optimization (e.g. header compression) normally requires that this function be restarted. In some cases, such as defined in 3GPP specification (RRC signalling), relocation of the context for these functions may be supported. Relocation of the context (i.e. the state used by the optimization function), when possible, helps the function to maintain a certain level of efficiency and normally removes the need to restart the entire procedure of establishing the context used by the function.

Robust Header Compression (ROHC)

Header compression is often characterized as the interaction of a compressor with a decompressor state machine, which maintains some state information related to the flow(s) being compressed in a context (see definitions below).

ROHC is an extensible framework for which profiles for compression of various protocols may be defined. For real-time multimedia services (e.g. voice, video), the application data is transported end-to-end within an IP/UDP/RTP stream. Header compression of IP/UDP/RTP is defined by the ROHC profile 0x000 (ROHC RTP) and by RoHCv2 profile 0x0101, and is applicable for Voice-over-IP (VoIP) services among others.

The ROHC header compression scheme has been designed to efficiently compress the headers over an arbitrary link layer. Except for negotiation, ROHC profiles only requires Framing and error detection to be provided by the link layer, while all other functionality is handled by the ROHC scheme itself.

A number of ROHC profiles have been defined for compression of:

| | |
|---|---|
| No compression, all IP stack combinations | profile 0x0000, |
| IP/UDP/RTP headers | profile 0x0001, 0x0101, profile 0x0005, 0x0105, |
| IP/UDP headers | profile 0x0002, 0x0102, |
| IP/ESP headers | profile 0x0003, 0x0103, |
| IP-only headers | profile 0x0004; 0x0104, |
| IP/TCP headers | profile 0x0006, |
| IP/UDP-Lite/RTP headers | profile 0x0007, 0x0107, |
| IP/UDP-Lite headers | profile 0x0008, 0x0108. |

Note that the profile that does not compress (0x0000) is for IP traffic that cannot be compressed (no profile for the type of header combination, or lack of resources for [de]compression) but that should co-exist with compressed flows over the RoHC channel. For such traffic, the IP-only profile may be used if available resources allows.

Header Compression State Machines and Context Synchronization

One can usually realize a header compression scheme (such as a ROHC Profile) as a state machine and the challenging task is to keep the compressor and decompressor states, called contexts, consistent with each other, while keeping the header overhead as low as possible. There is one state machine for the compressor, and one state machine for the decompressor. The compressor state machine directly impacts the level of compression efficiency, as it is an important part of the logic controlling the choice of compressed packet type to be sent; the purpose of the decompressor state machine is mainly to provide the logic for feedback (if applicable) and to identify the packet types for which decompression may be attempted.

Packet Types and Context Updates

A packet that provides the means for the decompressor to verify successful decompression is a context-updating packet. Because decompression can be verified, this type of packet can update the context. For ROHC, context-updating packet types carry a Cyclic Redundancy Code (CRC) within their format; this is a checksum calculated over the original uncompressed header. This CRC is used to verify successful decompression of each packet; when successful, the context can be updated.

A packet that relies on other means to guarantee successful decompression—i.e. a packet format does not provide the means for the decompressor to verify successful decompression, and that only carries the information necessary for the decompression itself, is a self-contained packet. These packets do not update the context.

Modes of Operation

The ROHC profiles defined in: Carsten Bormann, et al. *RObust Header Compression (ROHC): Framework and four profiles: RTP, UDP, ESP and uncompressed*. IETF RFC 3095, April 2001; Jonsson, L. and G. Pelletier, RObust Header Compression (ROHC): A compression profile for IP, IETF RFC 3843, June 2004; and, Pelletier, G., RObust Header Compression (ROHC): Profiles for UDP-Lite, IETF RFC 4019, April 2005 all support three different modes of operation. In short, for a specific context, the mode controls the actions and the logic to perform as well as the packet types to use during different states of the header compression operation. Packet types and formats that are allowed may vary from one mode to the other. The Unidirectional mode (U-mode) is used at the beginning of any ROHC compression before any transition to other modes may occur. The Bidirectional Optimistic mode (O-mode) aims to maximize the compression efficiency and sparse usage of the feedback channel. The Bidirectional Reliable mode (R-mode) aims to maximize robustness against loss propagation and context damage propagation. Each mode of operation has different properties in terms of compression efficiency, robustness and processing complexity.

In U-mode, packets are sent from compressor to decompressor only; this mode is thus usable over links where a return path from decompressor to compressor is either not desired or not available, and periodical refreshes are used in this mode. The U-mode is particularly applicable to broadcast or multicast channels.

The O-mode is similar to the U-mode, with the difference that a feedback channel is used to send error recovery requests and (optionally) acknowledgements of significant context updates from the decompressor to compressor.

Note that for most ROHC profiles, the U-mode and the O-mode are often indistinctly referred to using the term U/O-mode. This is because the U-mode and the O-mode have rather similar characteristics, such as an identical set of packets formats for both modes as well as a similar logic to perform context updates. This logic is called the optimistic approach, and provides robustness against packet losses for the context update procedure in U/O-mode.

The R-mode differs significantly from the two other modes. In particular, the R-mode uses a few different packet types only understood and useful in this mode. However, the R-mode differs mainly by making a more extensive usage of the feedback channel and it uses a stricter logic for performing context updates. This logic is based on the secure reference principle, and provides robustness against packet losses for the context update procedure in R-mode.

Robustness Principles in Robust Header Compression—Optimistic Approach

A header compressor may use the optimistic approach to reduce header overhead when performing context updates. The compressor normally repeats the same update until it is fairly confident that the decompressor has successfully received the information. The number of consecutive packets needed to obtain this confidence is typically open to implementations, and this number is normally related to the packet loss characteristics of the link where header compression is used. All the packet types used with the optimistic approach are context updating.

The compressor normally updates its compression context for each packet that it sends.

The header decompressor normally updates its context after verifying the outcome of the decompression, using the CRC carried within the compressed header (always present in the packet format when operating using the optimistic approach).

Robustness Principles in Robust Header Compression—Secure Reference Principle

A header compressor may use the secure reference principle to ensure that context synchronization between compressor and decompressor cannot be lost due to packet losses. The compressor obtains its confidence that the decompressor has successfully updated the context from a context-updating packet based on acknowledgements received by the decompressor. However, most packet types used with the secure reference principle are self-contained and thus not meant to update the context.

The compressor normally updates its compression context only after receiving acknowledgements from the decompressor for a context updating packet (identified using the MSN in the feedback message).

The decompressor normally updates its context after verifying the outcome of the decompression, using the CRC carried within the compressed header (when present in the packet format, not always true when operating using the secure reference principle). Subject to rate limitation, the decompressor normally acknowledges the update to the compressor.

Current Status of RoHC

The "simplified ROHC framework", or rather the specification of the ROHC framework as an independent document, is published as IETF RFC4095.

The RoHCv2 profiles currently being developed handle out-of-order delivery between compression endpoints, among other improvements.

Recent Trends and Evolutions in Network Architectures

In GSM/EDGE systems, the Gateway GPRS Support Node (GGSN) normally hosts the header compression function.

In the UTRAN architecture, the Radio Network Control (RNC) function hosts the header compression function.

In contrast, the SAE/LTE architecture does not have a RNC. Originally, the architecture specified that the header compression function be located in the PDCP in the Access Gateway (aGW), but later the PDCP function was moved to the eNB. The impact of this decision is that mobility events, from the header compression perspective, will be more frequent than if located in the aGW. Restarting compression requires that a number of uncompressed headers are sent; this may not be sufficiently efficient. More advanced mechanisms, such as relocation of the compression context, may be required.

The concept of context relocation for header compression is not novel. There exist a number of prior art to optionally support context relocation in UTRAN. However, a compression context is not simply a matter of transferring some data from one point to another; it is often believed that it is, for example, sufficient to transfer one IP header to account for the entire transfer of the compression context. What type of data, under what format and how to have the relocation process interact with the header compression algorithm is a very complex issue, one that a close analysis of prior art reveals has not been properly addressed.

One prior art approach is shown in U.S. Pat. No. 6,300,887, which discloses a method of relocating of header compression/decompression functions between a plurality of network entities and mobile compressors and/or mobile decompressors. The method relies on a secure reference, relies on absolute decompressor/compressor context synchronization, requires a (explicit or waited for) specific context synchronization event between compressor and decompressor (e.g. Decompressor feedback with ack and context ID/SN), depends on a particular state of validity for the context (all or partial) at the time of relocation, and, is not applicable generally to header compression algorithms that constantly update their context (e.g. "RoHC U/O-mode" type of operation), only to R-mode. Further:

All information exchange is dependent on the state of the flows at time of relocation: a context cannot be relocated
  unless a packet is available, AND
  unless feedback channel is active, AND
  unless the context is valid
It focus only on synchronization between compressor and decompressor contexts
No compression is possible in source AFTER the context has been relocated (hard handoff).

Another prior art approach is shown in US-2002091860 A1, which discloses a method of relocating the header compression context in a packet network which transmits packets having compressed headers. The relocation is based on stopping the updating of the context by:
  decompressor stops sending feedback
  compressor send uncompressed packets when relocation starts
  compressor ignores feedback received by decompressor
Thus, the state-of-the-art requires:
  compression in the source node to be stopped, so that the context is frozen in a synchronized manner between source compressor and target compressor for the downlink (or decompressors for uplink, respectively); i.e. the synchronized aspect of the procedure focuses on synchronizing the exchange of context information in the Radio Access Network (RAN) by first stopping compression;
  the source for relocation to have absolute confidence in the state of the context in the UE, i.e. it is based on a precondition that only a context that has been acknowledged can be relocated, which may not always be timely.

The impact of the above characteristics of the state-of-the-art solution(s) is that the interruption time during a mobility event cannot be minimized, and as a consequence of stopping compression is that no packets can be transmitted from the source node. Relocation may not be possible either without some additional delay for preparing the context, and waiting for acknowledgement from the decompressor.

There is today no working solution that allows a context relocation mechanism to have the following properties:
  to allow the source node (from where a context is taken) to continue compression and transmitting packets even after the context information being relocated is extracted and sent to the target node (i.e. during the mobility event);
  to allow the target node to resume compression in the most efficient ratio from the first packet that it starts to compress after having received the context form the source node.
  to relocate a context in an interoperable manner, i.e. relocation of a context based on a compression algorithm that does not rely strictly on acknowledgements and on a secure reference (algorithms that relies on the optimistic approach);
  to allow the relocation process to start at any time during the lifetime of a compression context.

The main problem addressed by the invention proposed herein is how to properly relocate a header compression context during mobility event, to improve the spectral efficiency of the handover procedure and minimizing interruption time.

Further problems addressed by the invention are: to make context relocation possible for header compression algorithms that are not strictly based on acknowledgements (and on a secure reference); to allow the source node to continue compressing and transmitting packets even under the mobility event, to allow the eNB to either start relocation early or to empty its queues and/or complete any pending transmissions; and, to allow starting the relocation procedure at any arbitrary time, without involving the mobile terminal.

Thus, there is need for methods and apparatuses overcoming at least one of the above mentioned problems.

SUMMARY OF THE INVENTION

Accordingly, one objective with the present invention is to provide an improved method of relocating a header compression context of data packets from a source communication network node to a target communication network node during a mobility event in a communication network system, in which said data packets comprising said compressed headers are transmitted initially between a compression endpoint in said user equipment and a compression endpoint in said source communication network node and after said mobility event between a compression endpoint in said user equipment and a compression endpoint in said target communication network node over a radio interface.

According to a first aspect of the present invention this objective is achieved through the characterizing portion of claim 1, which specifies that a header compression context is efficiently relocated by a method which comprises the step of disabling context updating properties of each individual header during the relocation process.

Another objective with the present invention is to provide an improved apparatus for relocating a header compression context of data packets from a source communication network node to a target communication network node during a mobility event in a communication network system, in which said data packets comprising said compressed headers are transmitted initially between a compression endpoint in said user equipment and a compression endpoint in said source communication network node and after said mobility event between a compression endpoint in said user equipment and a compression endpoint in said target communication network node over a radio interface.

According to a second aspect of the present invention this other objective is achieved through the characterizing portion of claim 16, which specifies that a header compression context is efficiently relocated by an apparatus which comprises means for disabling context updating properties of each individual header during the relocation process.

A further objective with the present invention is to provide an improved method in a user equipment of relocating a header compression context of data packets from a source communication network node to a target communication network node during a mobility event in a communication network system, in which said data packets comprising said compressed headers are transmitted initially between a compression endpoint in said user equipment and a compression endpoint in said source communication network node and after said mobility event between a compression endpoint in said user equipment and a compression endpoint in said target communication network node over a radio interface.

According to a third aspect of the present invention this further objective is achieved through the characterizing portion of claim 31, which specifies that a header compression context is efficiently relocated by a method which comprises the step of receiving data packets marked as non-updating from said source communication network node during the relocation process when context updating properties of each individual header is disabled during the relocation process.

A yet further objective with the present invention is to provide an improved user equipment for relocating a header compression context of data packets from a source communication network node to a target communication network node during a mobility event in a communication network system, in which said data packets comprising said compressed headers are transmitted initially between a compression endpoint in said user equipment and a compression endpoint in said source communication network node and after said mobility event between a compression endpoint in said user equipment and a compression endpoint in said target communication network node over a radio interface.

According to a fourth aspect of the present invention this further objective is achieved through the characterizing portion of claim 32, which specifies that a header compression context is efficiently relocated by a user equipment comprises a receiver arranged to receive data packets marked as non-updating from said source communication network node during the relocation process when context updating properties of each individual header is disabled during the relocation process.

Further embodiments are listed in the dependent claims.

Thanks to the provision of methods and apparatuses, which disable the context updating properties of each individual header while a source communication network node continues to transmit data packets to the user equipment during the relocation process, the interruption time at handovers is minimized since the compression continues during the relocation. Further, the target communication network node is allowed to start in most efficient compression ratio from the first packet, i.e. the spectrum efficiency during handovers is optimized. The invention works well with NACK-based header compression algorithms, e.g. RoHC U/O-modes.

What is believed to be novel with the invention is:
- to synchronize the context relocation based on compression endpoints, not based on relocation endpoints as in prior art; this enables relocation process of a context that is not based on acknowledgement between compression endpoints. It also allows compression in the source to continue even under the relocation process.
- the methods and type of information that is exchanged during relocation to enable the above.

The invention is applicable to header compression algorithms based on the optimistic approach, and:
- Does not rely on a secure reference for header compression
- Does not rely on absolute decompressor/compressor context synchronization
- Does not require any (explicit or waited for) specific context synchronization event between compressor and decompressor (e.g. RoHC ACKs)
- Does not depend on a particular state of validity for the context (all or partial) at the time of relocation
- Applicable generally to header compression algorithms that constantly update their context (e.g. "RoHC U/O-mode" type of operation)

Further, the invention allows compression to robustly continue in the source node after the context has been "frozen" and while it is being relocated, and:

- Traffic may continue to flow during the relocation/handover setup
- Relocation can be performed ahead of handover with minimal performance impact and no disruption Still other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DEFINITIONS

Header Compression Context

A compression context contains and maintains relevant information about past packets, and this information is used to compress and decompress subsequent packets. Taken from Carsten Bormann, et al. *RObust Header Compression (ROHC): Framework and four profiles: RTP, UDP, ESP and uncompressed*. IETF RFC 3095, April 2001:

"The context of the compressor is the state it uses to compress a header. The context of the decompressor is the state it uses to decompress a header. Either of these or the two in combinations is usually referred to as "context", when it is clear which is intended. The context contains relevant information from previous headers in the packet stream, such as static fields and possible reference values for compression and decompression.

Moreover, additional information describing the packet stream is also part of the context, for example information about how the IP Identifier field changes and the typical inter-packet increase in sequence numbers or timestamps."

Compression is possible as long as the decompressor context is synchronized with the view that the compressor has of this state. When this is not the case, the compressor normally initiate logic and packet type selection to repair the discrepancies.

BRIEF DESCRIPTION OF THE DRAWINGS

In the drawings, wherein like reference characters denote similar elements throughout the several views.

DETAILED DESCRIPTION

Figure 1:
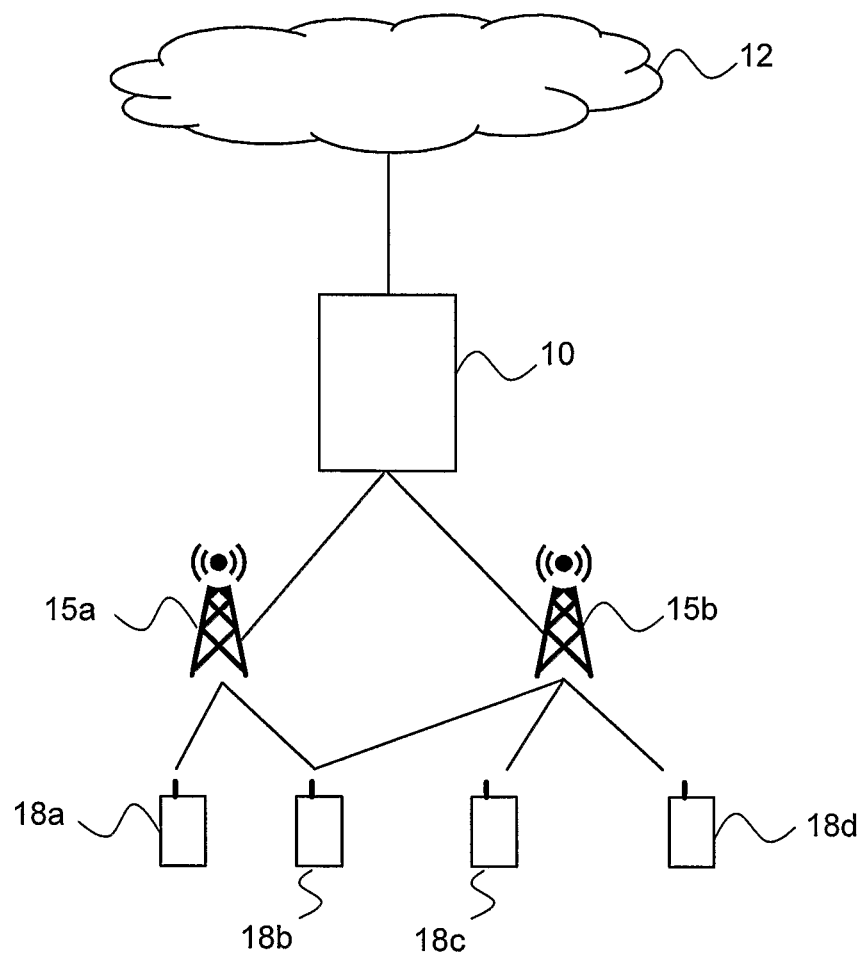
FIG. 1 shows an example of a WCDMA communication network architecture.

FIG. 1 depicts a communication system, such as a Wideband Code Division Multiple Access (WCDMA) system, including a Radio Access Network (RAN), such as the UMTS Terrestrial Radio Access Network (UTRAN) architecture, comprising at least one Radio Base Station (RBS) (or Node B) 11*a*-*b*, connected to one or more Radio Network Controllers (RNCs) 10 (only one shown in FIG. 1). The RAN is connected over an interface to a Core network (CN) 12, which may be a connection-oriented external CN such as the Public Switched Telephone Network (PSTN) or the Integrated Services Digital Network (ISDN), and/or a connectionless external CN as the Internet.

The RAN and the CN 12 provide communication and control for a plurality of user equipments (UE) 18*a*-*d*. The UEs 18 each uses downlink (DL) channels and uplink (UL) channels to communicate with at least one RBS 15 over a radio or air interface.

Figure 2:
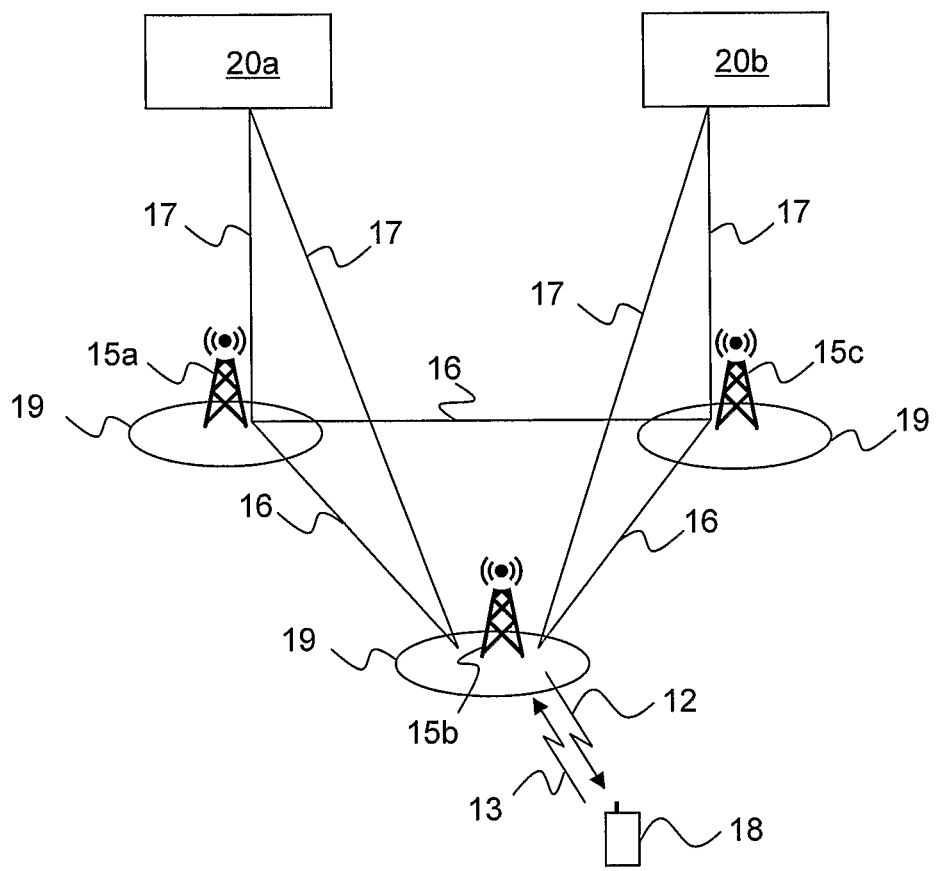
FIG. 2 shows an example of a LTE communication network architecture.

Another communication system, such as a Long Term Evolution (LTE) system is shown in FIG. 2, including a Radio Access Network (RAN), comprising at least one Radio Base Station (RBS) (or eNode B) 15*a*, 15*b* and 15*c*. The RAN is connected over an interface such as the S1-interface 27 to at least one Evolved Packet Core (EPC) 20*a* and 20*b*, which is connected to external networks (not shown in FIG. 2) such as the Public Switched Telephone Network (PSTN) or the Integrated Services Digital Network (ISDN), and/or a connectionless external network as the Internet. Each EPC 20*a* and 20*b* comprises e.g. a Mobility Management Entity (MME) gateway which handles control signalling for instance for mobility and a User Plane Entity (UPE).

The RAN provides communication and control for a plurality of user equipments (UE) 18 (only one shown in FIG. 2) and each RBS 15*a*-15*c* is serving at least one cell 29 through and in which the UEs 18 are moving. The RBSs 15*a*-15*c* are communicating with each other over a communication interface 26, such as X2. The UEs each uses downlink (DL) channels 22 and uplink (UL) channels 23 to communicate with at least one RBS over a radio or air interface.

According to a preferred embodiment of the present invention, the communication system is herein described as a WCDMA and a LTE communication system. The skilled person, however, realizes that the inventive method and arrangement work very well on all communications system, such as Wimax. The user equipments 18 may be mobile stations such as mobile telephones ("cellular" telephones) and laptops with mobile termination and thus can be, for example, portable, pocket, hand-held, computer-included or car-mounted mobile devices which communicate voice and/or data with the RAN.

The basic idea of the present invention is to mark compressed packets as non-updating during a mobility event, such as a handover procedure, thereby disable updating properties of each individual header compressed packet types under the relocation process between the compression endpoints when involving the source of the relocation, and restoring the context updating properties of the compressed headers after the completion of the relocation in the target of the relocation. Another idea is to exchange specific header compression contents to allow the target compression endpoint to start directly in the most efficient compression ratio. When relocating a compressor context, this information consists mainly of two "constructed" reference headers, a sliding window containing selected information, a validity mask applied on this window. When relocating a decompressor context, this information consists mainly of one reference header and a validity mask for the fields of this reference header.

Figure 3:
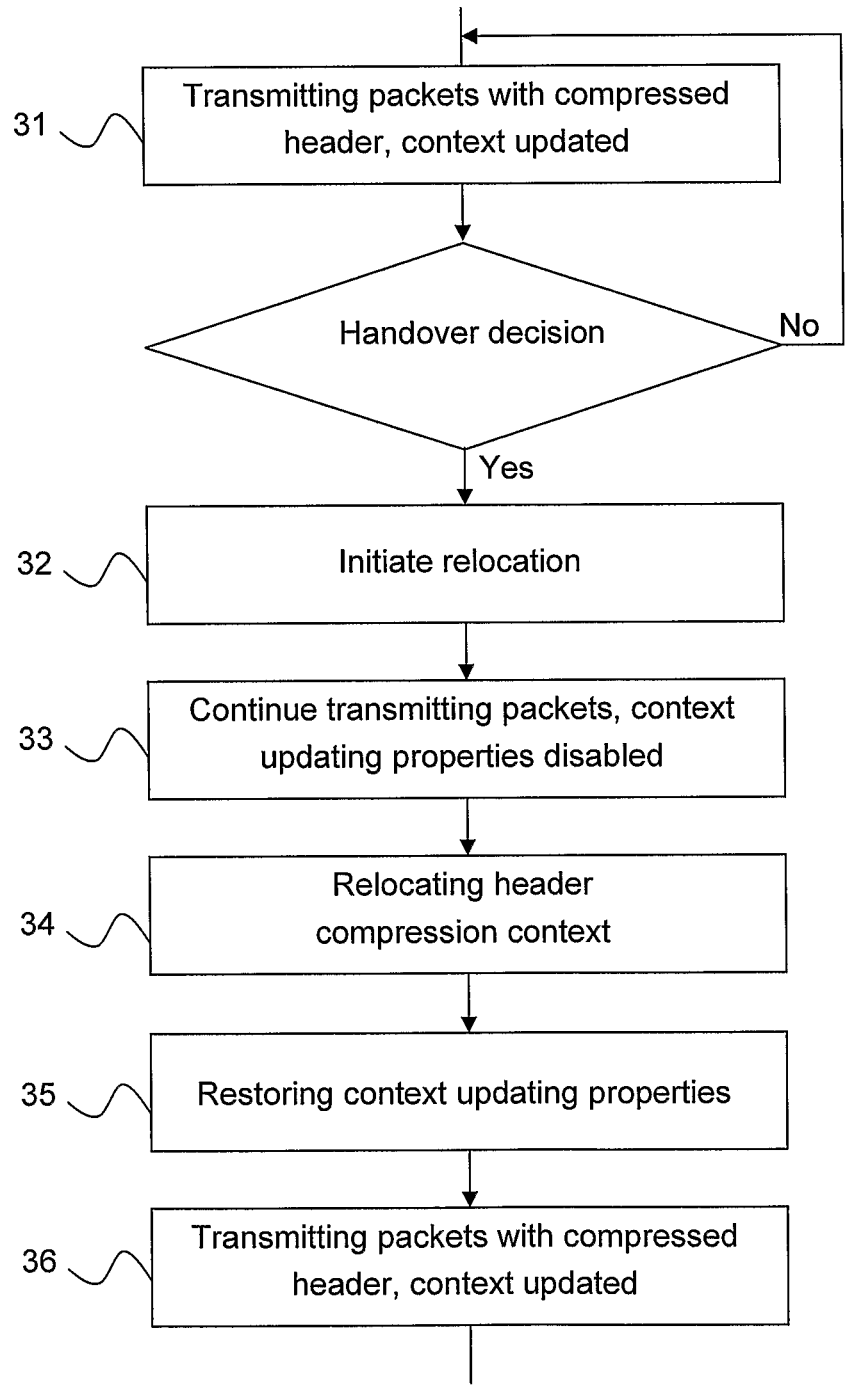
FIG. 3 is a flowchart of the steps performed in a general procedure according to the present invention.

According to the preferred embodiment of the present invention, a general procedure for efficiently relocating a header compression context of data packets, as shown in FIG. 3, is as follows:

A source communication network node, such as a source eNB is compressing headers of data packets, transmitting the data packets with the compressed headers to a user equipment on downlink channels and updating context of header compression (step 31);

If a mobility event occurs, such as if a handover decision is taken by the source eNB, initiating a relocation of header compression context from the source eNB to a target communication network node, such as a target eNB (step 32);

The source eNB continues compressing headers and transmitting data packets to the UE but is disabling the context updating properties of each individual header during the relocation process (step 33);

Finishing relocation process to the target eNB (step 34);

Restoring the context updating properties in target eNB (step 35);

The target source eNB is compressing headers of data packets, transmitting the data packets with the compressed headers to the user equipment on downlink channels and updating context of header compression (step 36).

Below an embodiment of the present invention is described, based on, but not limited to, the RoHC profiles including compressor and decompressor behaviour as described in prior art.

Marking Compressed Packets as Non-Updating During Mobility

As mentioned above one of the basic idea of the present invention is to disable updating properties of each individual header compressed packet types under the relocation process.

A non-updating packet does incur any changes to the decompressor state it uses to decompress packets:

whether a packet is context updating or not is typically related to the properties of each packet format defined in a specification, e.g. in ROHC whether the format carries a CRC over the original uncompressed header or not (this CRC allows the decompressor to verify the outcome of a decompression attempt). It could also be bound to the packet type identifier even if a CRC is present.

a context is said to be updated when the compression entity uses the header information in a packet it has just processed (either compressed or decompressed) to modify the state it will use when processing the next packet for the same flow. The compressor can update its state when it selects a packet formats that is context updating (e.g. has a CRC). Ideally in the decompressor, this state should have been verified to be correct by verification of the decompression attempt using the CRC.

According to the preferred embodiment during the mobility event, i.e. when the handover procedure starts, the compressed packets are marked as non-updating in the following way:

On the downlink: the output of the source compressor is marked as non-updating for the decompressor context in the user equipment; this indication is conveyed or applied for each compressed packet originating from the source compressor, i.e. in the source eNB, during the mobility event.

On the uplink: the output of the compressor in the user equipment is marked as non-updating for the decompressor context in the source compressor, i.e. in the source eNB; this indication is conveyed or applied for each compressed packet originating from the compressor during the mobility event.

The marking may be either e.g. an indicator inside the compression protocol format, inside a layer 2 protocol (e.g. PDCP header) or applied by establishing state using signalling or derived (implicitly) from mobility signalling at both compression endpoints. Thus, individual packets are marked using: in-band signal inside the header compression protocol; a signal inside a protocol supporting header compression; different layer 2 encapsulation; a modified state in said decompressor, e.g. by updating a control field (using optimistic approach or feedback).

The source compressor transmits the proper context information for the flow to the target compressor. This is described in more detail further below.

When the mobility event, i.e. when the handover procedure, is completed:

On the downlink: the source compressor has stopped processing packets. The target compressor starts operation using the relocated context, without marking the packets (i.e. the compression resumes with the normal updating properties for the compressed headers).

On the uplink: the output of the compressor in the user equipment resume without marking the packets (i.e. the compression resumes with the normal updating properties for the compressed headers).

The context updating properties of each individual header are restored after the relocation process, i.e. when the endpoint of the compression channel is moved to the target communication network node and becomes active, preferably by using a three-way handshake based on decompressor feedback, using acknowledgement (e.g. first) successful decompression after handover completed, when context state is used to activate/deactivate context updating properties of compressed headers.

With RoHC U/O-mode, the compressor context is normally always updated, which means that typically all packet types may thus update the decompressor context, however, the decompressor context is updated only if the CRC succeed, meaning that there are cases when the decompressor context is not updated.

According to a preferred embodiment of the invention a control communication network entity is signalling to the endpoint to be relocated, to disable or to restore the updating properties for the purpose of relocation. Further, the context relocation in the network part is synchronized with each other, preferable on the X2-interface, without involving the user equipment.

Figure 4:
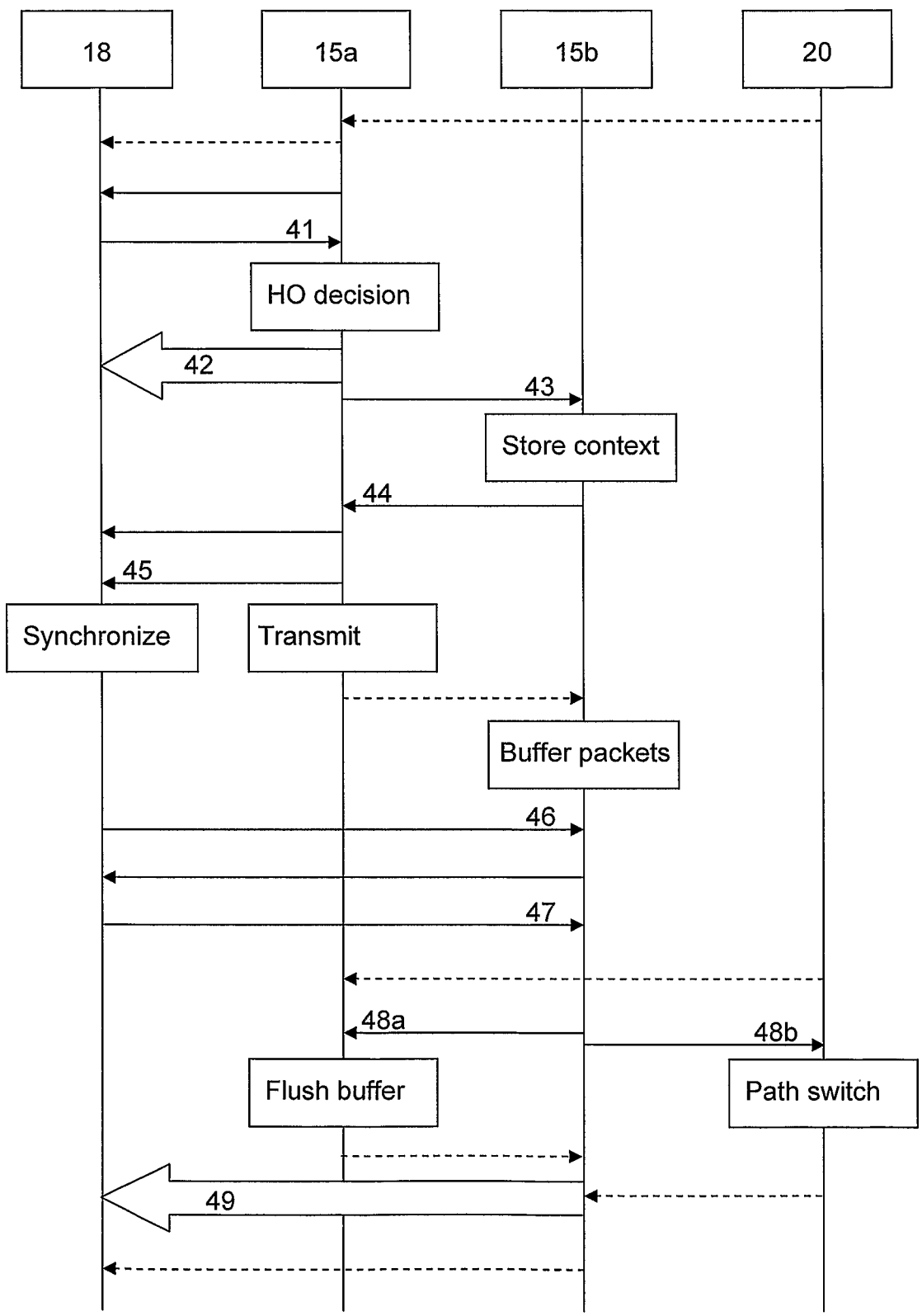
FIG. 4 shows a signalling example for LTE in the core network according to the present invention.

A signaling example for a LTE communication network system for an embodiment when the PDCP is in the core network is shown in FIG. 4. In FIG. 4 the dashed arrows represent user data and the signaling is between the user equipment 18, the source communication network node (source eNB) 15a, the target communication network node (target eNB) 15b and the EPC (MME/UPE) 20.

In FIG. 4, user packet data to be delivered to the UE 18 is transmitted from the MME/UPE 20 to the source eNB 15a, which forwards the data to the UE 18 and sends UL allocation to the UE 18. The UE 18 continuously sends measurement reports to the source eNB 15a, denoted with 41. When the measurement reports indicate that the quality of the communication is decreasing, the source eNB 15a makes a handover decision to move the UE 18 to a cell being served by the target eNB 15b. The source eNB 15a starts transmitting data packets marked as non-updating (PDCP/HC no_update) at 42 and sends the context data (UE RAN context) to the target eNB 15b at 43. The PDCP/HC no_update may be implicit based on binding HO command to X2 message from source eNB 15a to target eNB 15b. The target eNB 15b stores the UE RAN context and reserves C-RNTI and sends a context confirm (new C-RNTI) message to the source eNB 15a at 44. The source eNB 15a signals DL allocation to the UE 18 and sends a handover command (with new C-RNTI) at 45. The UE 18 detaches from the old cell and synchronizes to the new cell and the source eNB 15a delivers buffered and in-transit packets to the target eNB 15b, whereby the target eNB 15b buffers packets received from the source eNB 15a. Then the UE 18 synchronizes with the target eNB 15b at 46 and receives UL allocation and time alignment (TA) from the target eNB 15b. Next, the UE 18 sends a handover confirm message to the target eNB 15b at 47 and the target eNB 15b sends a handover complete message to the source eNB 15a at 48a and a UE update message to the MME/UPE 20 at 48b. The MME/UPE performs path switching and sends the user packet data to the target eNB 15b instead of to the source eNB 15a. The source eNB 15a flushes the DL buffer and continues to deliver in-transit packets received from the MME/UPE 20 to the target eNB 15b as long as the MME/UPE 20 hasn't performed the path switching. Then the target eNB 15b starts transmitting user packet data which is not marked (PDCP/HC update) at 49, which also may be implicit.

Figure 5:
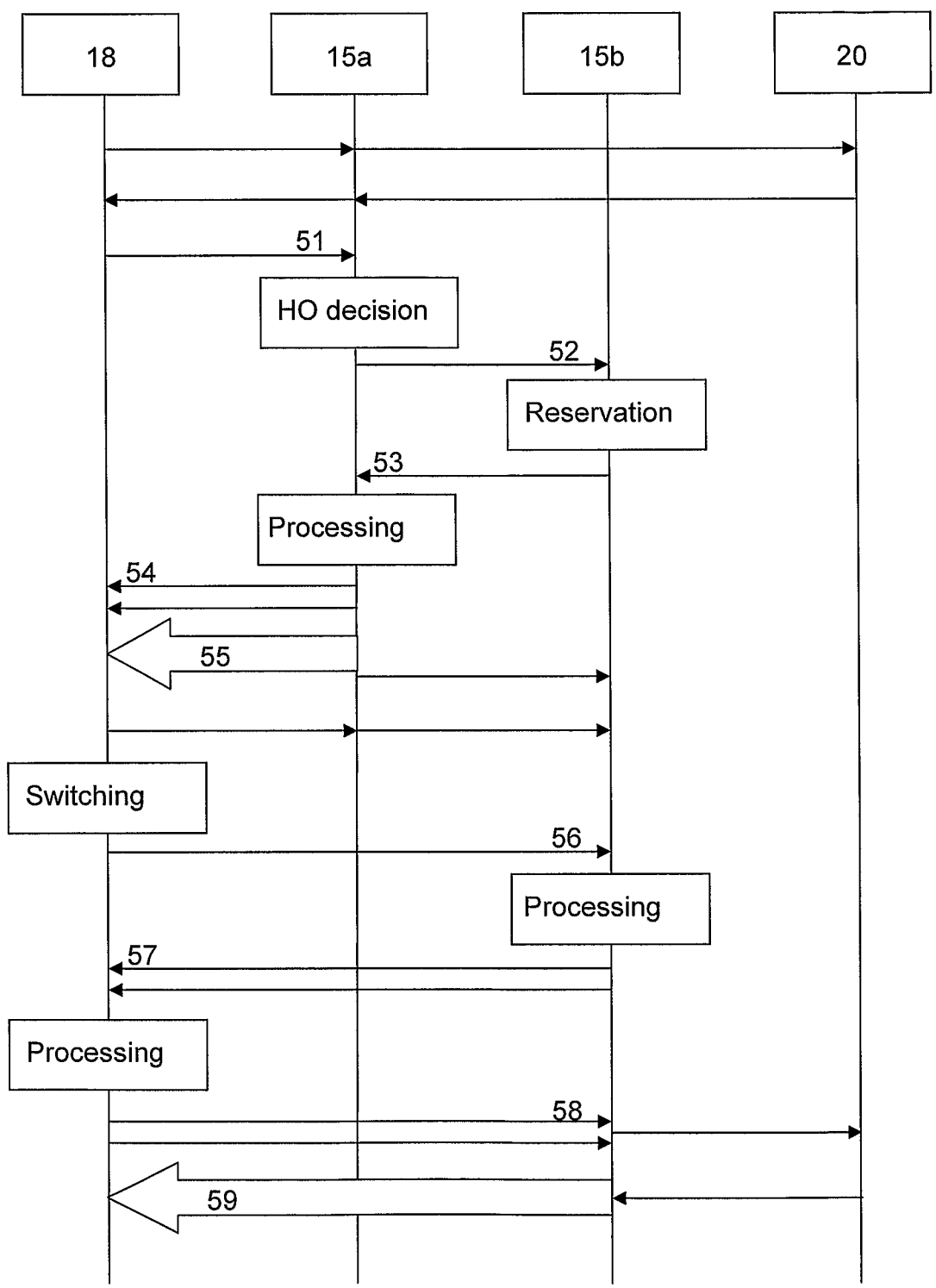
FIG. 5 shows a signalling example for LTE in the eNB according to the present invention; and, FIG. 6 shows an interpretation interval of a least significant bit encoding.

The signaling mechanism according to another embodiment of a LTE communication network system where the PDCP is in the eNB is shown in FIG. 5. User data and signalling is sent between the user equipment 18, the source communication network node (source eNB) 15a, the target communication network node (target eNB) 15b and the EPC (MME/UPE) 20.

The UE 18 continuously sends measurement reports to the source eNB 15a, denoted with 51. When the measurement reports indicate that the quality of the communication is decreasing, the source eNB 15a makes a handover decision to move the UE 18 to a cell being served by the target eNB 15b and sends a handover request message to the target eNB 15b at 52. Target eNB 15b makes a resource reservation and sends a handover request confirm message back to source eNB 15a at 53. The source eNB 15a processes and sends a handover command 54 to the UE 18. The source eNB 15a starts transmitting data packets marked as non-updating (PDCP/HC no_update) at 55 to the UE 18 and forwards received user packet data to the target eNB 15b. Both UL/DL data may be sent in last TTI (in case of error the packet will be re-transmitted in the target cell). The UE 18 then switches and sends a random access message 56 using dedicated preamble to the target eNB 15b, whereby the target eNB 15b processes and sends time alignment/scheduling grant message 57 (for handover complete and UL data) to the UE 18. DL data is sent on the TTI just after message 57. The UE 18 processes and sends a handover complete message 58 to the target eNB 15b. The target eNB 15b sends a path switch request to the MME/UPE 20 and receives data on the direct path from the MME/UPE 20. Then the target eNB 15b starts transmitting user packet data which is not marked (PDCP/HC update) at 59. UL data is sent on the same TTI as message 58, the handover complete message.

Exchange of Context Information During Relocation

Another basic idea of the present invention is to exchange specific header compression contents to allow the target compression endpoint to start directly in the most efficient compression ratio. When relocating a compressor context, this information consists mainly of two "constructed" reference headers, a sliding window containing selected information, a validity mask applied on this window. When relocating a decompressor context, this information consists mainly of one reference header and a validity mask for the fields of this reference header.

An update to a context for a field is normally repeated using the same type of information a number "OA" of times when using the optimistic approach (NACK-based scheme).

Figure 6:
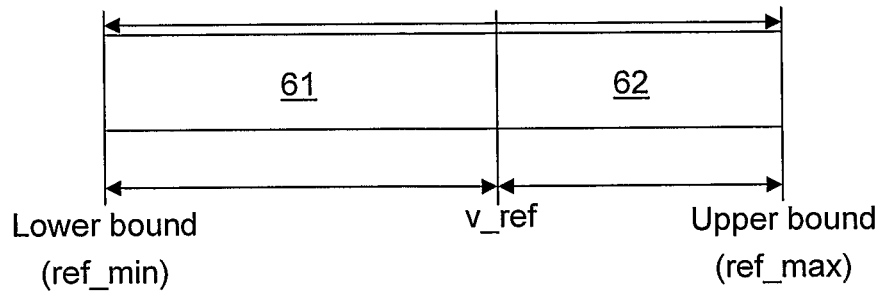

FIG. 6 shows an interpretation interval of least significant bit (LSB) encoding, which is a robust encoding method used by some header compression algorithms to compress fields that are typically sequentially increasing (e.g. sequence numbers). The interpretation interval has the size $2^k$ and 61 illustrates the robustness to reordering max delta(SN)=p and 62 illustrates the robustness to consecutive losses max delta (SN)=$(2^k-1)$-p.

Basically, the v_ref is the reference used to compress (encoding) or to decompress (decoding) the value for the field that is LSB encoded. The total interval to interpret the encoded bits depends on how many bits are used to represent the encoded value; e.g. using k=4 bits, the interval is $2^k$=16. If the offset to this interval is −1, then ref_min is equal to v_ref+1 and the encoding can only be applied if the field to encode increased from its previous value, up to ref_max=v_ref+$(2^4)$+1. If the offset is 0, then the value to encode can be the same as v_ref, up to ref_max=v_ref+$2^4$ If the offset is >0, then it means that a value that has decreased wrt v_ref can be encoded, i.e. a value that is between v_min=v_ref−p and v max=v_ref+$2^4$−p.

In other words, the number of bits used to encode the value wrt a reference v_ref tells what minimum value and what maximum value can be encoded (ref_min and ref_max in FIG. 6). The value of the offset tells how much the encoded value can deviate negatively (area 61 in FIG. 6) from the reference value v_ref, and consequently by how much it can deviate positively (area 62 in FIG. 6).

For the compressor, relocated information includes:
two "constructed" reference headers, HDR_1 and HDR_2, per field
include an information validity mask for the information in the second header above (i.e. to derive the compressor "state" in the target compression endpoint, representing the compressor's view of the decompressor context, based on feedback received and optimistic approach)

The first header, HDR_1, represents a collection of the minimum values from a history of previous headers for each one of the dynamically changing fields and the second header, HDR_2, similarly represents a collection of the maximum values from a history of previous headers for each one of the dynamically changing fields. The context information corresponding to the non-dynamic fields is marked as valid (each field individually) if the field has been constant for the history corresponding to the number of repetition used to ensure robustness (OA), otherwise it is marked as invalid.

The number of repetitions is a compressor implementation parameter. Depending on the characteristics of the link over which header compression is applied, the number of repetitions is typically set to a value that is:
at least equal to the maximum number of consecutive losses that can occur for most packets (if reordering is not expected), or
related to the maximum reordering depth that can occur for most packets (if losses are not expected), or
to a value that takes both the above into consideration (if both losses and reordering are possible)
to 1 (i.e. no repetitions) if the channel is perfect (no losses, no reordering expected)

For the decompressor, relocated information includes:
the reference header, i.e. the last successfully decompressed header that updated the decompressor context
include an information validity mask (i.e. to derive decompressor "state" in the target compression endpoint. This is necessary because there is no guarantee that the entire context will be valid at moment the relocation is initiated). The validity mask is applied to each field individually.

Figure 7:
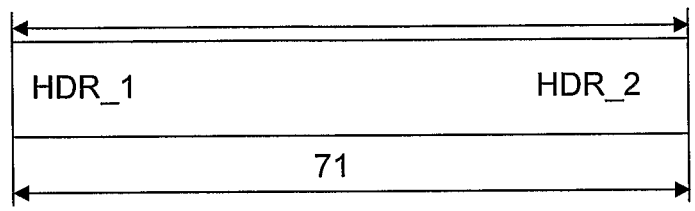
FIG. 7 shows a sliding window encoded with least significant bit.

FIG. 7 shows a sliding window for the fields that dynamically change. It is of size "OA" and contains a history of OA previous values 71 for the field, each of which may be used as s reference to encode or to decode the field. The value used for each field for constructed HDR_1 is the minimum (smallest) value for the field within this window (history) The corresponding value for constructed HDR_2 is the maximum (highest) value of this field within that same window. Thus, for each field that is LSB encoded the relocation information includes:
HDR_1 contains the minimum value in the sliding window (HDR_1 is MIN(v_ref);
HDR_2 contains the maximum value in the sliding window (HDR_2 is MAX(v_ref)).

Figure 8:
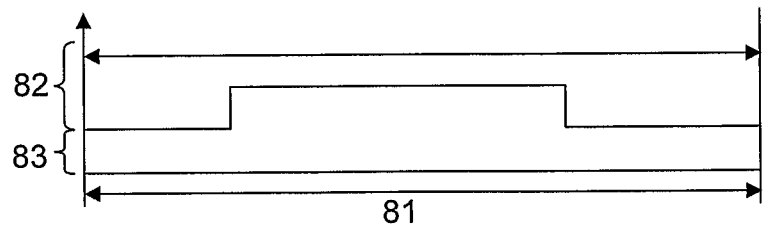
FIG. 8 shows a sliding window encoded with else than least significant bit.
Figure 9:
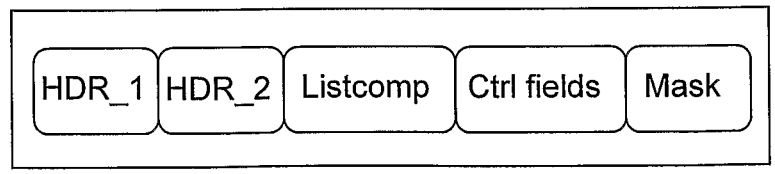
FIG. 9 shows a relocation container.

Another field coded with else than LSB (i.e. fields that do not dynamically change from one packet to another) is shown in FIG. 8, which is a sliding window with size "OA" and where 81 illustrates the history of previous field values. For each field if the value in the window (history with OA values for each field) has followed the expected behaviour, then the field is marked as valid, otherwise, it is marked as invalid. Thus, in FIG. 8, 82 represents Field_1 and 83 represents Field_2. If the value is constant from the last OA headers, then the mask marks the corresponding bits of the relocated headers as valid otherwise, the mask mark the field as "undefined". In FIG. 8 Field_1 is masked invalid and Field_2 is masked valid FIG. 9 shows a relocation container comprising HDR_1, HDR_2, CTRL fields, a mask and list compression. The list compression, either:
include the entire translation table (index, item) and the list structure (compressor or decompressor)
include only items present in last header and the list structure (item identifier) (compressor only)
don't include it (compressor only), results in re-initialization of the list compression FIG. 10 is a block diagram showing a user equipment 18, a source communication network node, such as eNB, 15a, and a target communication network node, such as eNB, 15b for efficiently relocating a header compression context of data packets from the source communication network node 15a to the target communication network node 15b during a mobility event in a communication network system, in which said data packets comprising said compressed headers are transmitted initially between a compression endpoint in said user equipment 18 and a compression endpoint in said source communication network node 15a and after said mobility event between a compression endpoint in said user equipment 18 and a compression endpoint in said target communication network node 15b on uplinks 13 and downlinks 12 channels over a radio interface.

Figure 10:
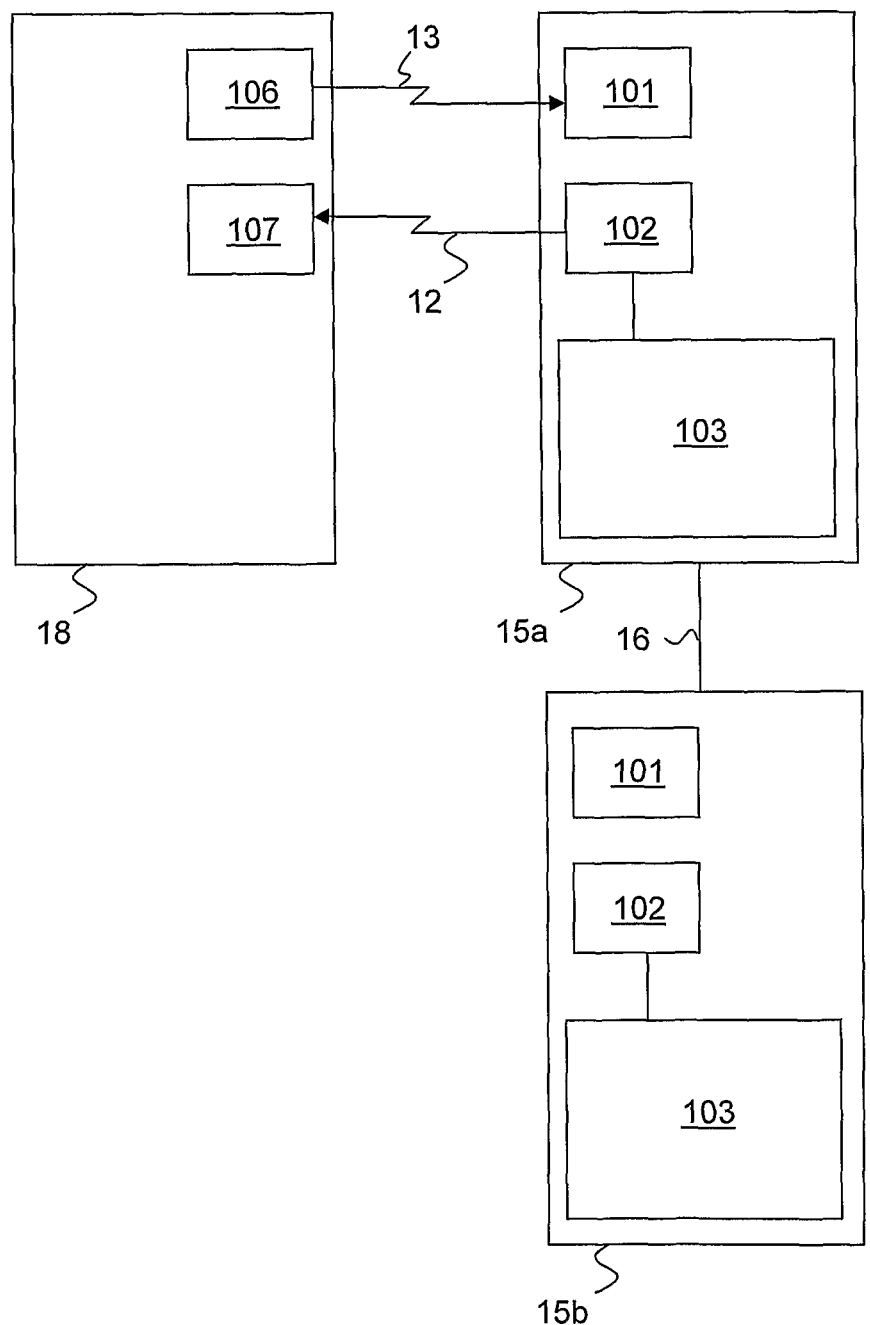
FIG. 10 is a simplified block diagram of the inventive user equipment and communication network nodes.

For simplicity on one of the two eNBs shown in FIG. 10 is described in the following. The eNB 15 comprises a radio transmitter 102 and a receiver 101. The transmitter 102 is transmitting data to a receiver 107 of the user equipment 18 over a radio interface on the downlink channel 12. The receiver 101 is receiving data from the user equipment 18 on the uplink channel 13. The eNB 15 further comprises means 103 for disabling context updating properties of each individual header during the relocation process.

The user equipment 18 comprises a radio transmitter 106 arranged to transmit data packets to the receiver 101 of the eNB 15a and 15b over the radio interface on the uplink channel 13 and a receiver 107 arranged to receive data packets transmitted from the transmitter 102 of the eNB 15a and 15b on the downlink channel 12.

The main embodiment foreseen is an apparatus consisting of a compression endpoint located in a user equipment and in a core network or in a radio access network, during a mobility event where relocation of contexts in occurs in the network side.

The present invention is applicable to any type of network node where header compression is performed, such as LTE inter-eNB or inter-aGW, inter UTRAN RNC, inter SGSN, UE, or inter-PDSN. According to the preferred embodiment, the invention is used in SAE/LTE systems and between eNBs over X2 interface, in conjunction with RoHC The present invention is further applicable to header compression in general, but particularly to any RoHC profiles, including—but not limited to—the ROHC RTP (0x0001), UDP (0x0002), IP (0x0004), ESP (0x0003), TCP (0x0006), UDP-Lite (0x0008), RTP/UDP-Lite (0x0007), ROHCv2 RTP (0x0101), ROHCv2 UDP (0x0102), ROHCv2 IP (0x0104), ROHCv2 ESP (0x0103), ROHCv2 UDP-Lite (0x0108), ROHCv2 RTP/UDP-Lite (0x0107) header compression profiles.

The proposed invention may be included entirely within RoHC with some modifications, such as:
   Additional mechanism in (general or profile-specific) RoHC header formats and related logic to either disable updating properties of a packet per-packet, or manipulate a context entry updated using OA to turn on/off updating logic of decompressor:
   Some additional feedback logic;
   External trigger(s) to stop updating the context (either HC only or both HC and HD using external synchronization); and,
   Definition of part of context that can be relocated (and what format).

Or, the proposed invention may be included entirely within 3GPP specifications with some modifications:
   Additional flag in e.g. PDCP header and related logic to RoHC implementation to disable updating properties per-packet and to turn on/off context updating in HD;
   Some feedback logic to RoHC implementation or to signalling;
   External trigger(s) to stop updating the context (either HC only or both HC and HD using external synchronization); and,
   Definition of part of context that can be relocated (and what format).

Modifications to embodiments of the invention described in the foregoing are possible without departing from the scope of the invention as defined by the accompanying claims.

Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural and vice versa.

Numerals included within parentheses in the accompanying claims are intended to assist understanding of the claims and should not be construed in any way to limit subject matter claimed by these claims.

The invention claimed is:

1. A method of relocating a header compression context of data packets from a source communication network node to a target communication network node during a mobility event in a communication network system, in which said data packets comprising said header compression context are transmitted initially between a compression endpoint in a user equipment and a compression endpoint in said source communication network node, and after said mobility event, between a compression endpoint in said user equipment and a compression endpoint in said target communication network node over a radio interface, said method comprising:
   disabling context updating properties of each individual header during the relocation process;
   relocating compressor context information from said source communication network node to said target communication network node, whereby said compressor context information comprises at least one of an information validity mask and two constructed headers per context, wherein each constructed header contains values for each field of a format of protocol headers that said context is compressing;
   wherein a first one of the constructed headers represents a collection of minimum values from a history of previous headers, one minimum value from each dynamically changing field, and a second one of the constructed headers represents a collection of maximum values from a history of previous headers, one maximum value from each dynamically changing field;
   marking said compressor context information corresponding to each non-dynamic field as valid if said field has been constant for a number of repetitions used to ensure robustness; and
   otherwise, marking said compressor context information as invalid.

2. The method according to claim 1, wherein the method further comprises said source communication network node continuing to transmit data packets marked as non-updating to said user equipment during said relocation process, to thereby minimize interruption time.

3. The method according to claim 2, wherein the method further comprises using at least one of the following for marking said data packets as non-updating:
   an in-band signal inside a header compression protocol;
   a signal inside a protocol supporting header compression;
   different layer 2 encapsulation;
   a modified state in said decompressor.

4. The method according to claim 1, wherein the method further comprises restoring said context updating properties in said target communication network node when said relocation process is completed.

5. The method according to claim 4, wherein the method further comprises basing said restoration on feedback from a decompressor arranged to decompress said headers.

6. The method according to claim 1, wherein the method further comprises signaling from a control communication network node to said compression endpoint in said source communication network node, to disable said context updating properties of each individual header during the relocation process.

7. The method according to claim 6, wherein the method further comprises signaling from a control communication network node to said compression endpoint in said target communication network node, to restore said context updating properties when said relocation process is completed.

8. The method according to claim 1, wherein the method further comprises synchronizing said context relocation between said source communication network node and said target communication network node.

9. The method according to claim 1, wherein the method further comprises relocating decompressor context information from said source communication network node to said target communication network node, whereby said information consists of one reference header, whereby said reference header is a last successfully decompressed header that has updated said context.

10. The method according to claim 9, wherein said decompressor context information comprises an information validity mask in order to derive a decompressor state in said target communication network node compression endpoint, which is applied to each field individually.

11. The method according to claim 1, wherein said communication network system is a long term evolution (LTE) network system.

12. The method according to claim 1, wherein said communication network system is a wideband code division multiple access (WCDMA) network system.

13. An apparatus for relocating a header compression context of data packets from a source communication network node to a target communication network node during a mobility event in a communication network system, in which said data packets comprising said header compression context are transmitted initially between a compression endpoint in a user equipment and a compression endpoint in said source communication network node, and after said mobility event, between a compression endpoint in said user equipment and a compression endpoint in said target communication network node over a radio interface, said apparatus comprising:
  a processor configured to
    disable context updating properties of each individual header compression context during the relocation process;
    relocate compressor context information from said source communication network node to said target communication network node, whereby said information comprises at least one of an information validity mask and two constructed headers per context, wherein each constructed header contains values for each field of a format of protocol headers that said context is compressing;
  wherein a first one of the constructed headers represents a collection of minimum values from a history of previous headers, one minimum value from each dynamically changing field, and a second one of the constructed headers represents a collection of maximum values from a history of previous headers, one maximum value from each dynamically changing field; and
    mark said compressor context information corresponding to each non-dynamic field as valid if said field has been constant for a number of repetitions used to ensure robustness, and otherwise, to mark said compressor context information as invalid.

14. The apparatus according to claim 13, wherein said source communication network node is arranged to continue to transmit data packets marked as non-updating to said user equipment during said relocation process, to thereby minimize interruption time.

15. The apparatus according to claim 14, wherein the apparatus is further configured to use at least one of the following for marking said data packets as non-updating:
  an in-band signal inside a header compression protocol;
  a signal inside a protocol supporting header compression;
  different layer 2 encapsulation;
  a modified state in said decompressor.

16. The apparatus according to claim 13, wherein the apparatus is further configured to restore said context updating properties in said target communication network node when said relocation process is completed.

17. The apparatus to claim 16, wherein the apparatus is further configured to base said restoration on feedback from a decompressor arranged to decompress said headers.

18. The apparatus according to claim 13, wherein the apparatus further comprises a control communication network node configured to signal to said compression endpoint in said source communication network node to disable said context updating properties of each individual header during the relocation process.

19. The apparatus according to claim 16, wherein the apparatus further comprises a control communication network node configured to signal to said compression endpoint in said target communication network node to restore said context updating properties when said relocation process is completed.

20. The apparatus according to claim 13, wherein the apparatus is further configured to synchronize said context relocation between said source communication network node and said target communication network node.

21. The apparatus according to claim 13, wherein the apparatus is further configured to relocate decompressor context information from said source communication network node to said target communication network node, whereby said information consists of one reference header, whereby said reference header is a last successfully decompressed header that has updated said context.

22. The apparatus according to claim 21, wherein said decompressor context information comprises an information validity mask in order to derive a decompressor state in said target communication network node compression endpoint, which is applied to each field individually.

23. The apparatus according to 13, wherein said communication network system is a long term evolution (LTE) network system.

24. The apparatus according to claim 13, wherein said communication network system is a wideband code division multiple access (WCDMA) network system.

* * * * *

UNITED STATES PATENT AND TRADEMARK OFFICE
CERTIFICATE OF CORRECTION

PATENT NO. : 8,488,583 B2  
APPLICATION NO. : 12/531409  
DATED : July 16, 2013  
INVENTOR(S) : Pelletier Page 1 of 1

It is certified that error appears in the above-identified patent and that said Letters Patent is hereby corrected as shown below:

In the Specification:

In Column 2, Line 15, delete "0×000" and insert -- 0×0001 --, therefor.

In Column 2, Line 21, delete "Framing" and insert -- framing --, therefor.

In Column 5, Line 60, delete "node." and insert -- node; --, therefor.

In Column 8, Line 53, delete "invention; and," and insert -- invention; --, therefor.

In Column 8, Line 60, delete "container;" and insert -- container; and --, therefor.

In Column 9, Line 4, delete "11a-b," and insert -- 15a-b, --, therefor.

In Column 12, Line 24, delete "(PDCPIHC" and insert -- (PDCP/HC --, therefor.

In Column 14, Line 21, delete "MIN(v_ref);" and insert -- MIN(v_ref)); --, therefor.

In the Claims:

In Column 17, Line 32, in Claim 13, delete "configured to" and insert -- configured to: --, therefor.

In Column 18, Line 18, in Claim 17, delete "apparatus to" and insert -- apparatus according to --, therefor.

In Column 18, Line 50, in Claim 23, delete "according to" and insert -- according to claim --, therefor.

Signed and Sealed this  
Twenty-sixth Day of November, 2013

Margaret A. Focarino  
*Commissioner for Patents of the United States Patent and Trademark Office*